United States Patent
Dees et al.

(10) Patent No.: US 10,538,307 B2
(45) Date of Patent: *Jan. 21, 2020

(54) HINGED RAKED WING TIP

(71) Applicant: The Boeing Company, Chicago, IL (US)

(72) Inventors: Paul W. Dees, Woodinville, WA (US); Mark S. Good, Seattle, WA (US); Seiya Sakurai, Seattle, WA (US); Jan A. Kordel, Redmond, WA (US); Stephen J. Fox, Everett, WA (US); Matthew A. Lassen, Seattle, WA (US); Bruce Robert Fox, Everett, WA (US); Steven Paul Walker, Arlington, WA (US); Gregory M. Santini, Bothell, WA (US)

(73) Assignee: The Boeing Company, Chicago, IL (US)

( * ) Notice: Subject to any disclaimer, the term of this patent is extended or adjusted under 35 U.S.C. 154(b) by 914 days.

This patent is subject to a terminal disclaimer.

(21) Appl. No.: 13/664,416

(22) Filed: Oct. 30, 2012

(65) Prior Publication Data

US 2013/0099060 A1    Apr. 25, 2013

Related U.S. Application Data

(63) Continuation-in-part of application No. 13/251,216, filed on Oct. 1, 2011, now Pat. No. 9,908,612.

(51) Int. Cl.
*B64C 3/56* (2006.01)
*B64C 3/58* (2006.01)

(52) U.S. Cl.
CPC .............. *B64C 3/56* (2013.01); *B64C 3/58* (2013.01); *Y02T 50/14* (2013.01)

(58) Field of Classification Search
CPC ........... B64C 3/56; B64C 23/065; B64C 5/12; B64C 5/08
USPC ... 244/49, 218, 39, 199.4, 124, 123.1, 123.8
See application file for complete search history.

(56) References Cited

U.S. PATENT DOCUMENTS

| | | | | |
|---|---|---|---|---|
| 2,289,224 A | * | 7/1942 | Anderson et al. | 244/49 |
| 2,290,850 A | * | 7/1942 | Umschweif | 244/49 |
| 2,418,301 A | * | 4/1947 | Heal | 244/91 |
| 2,719,682 A | * | 10/1955 | Handel | B64C 3/56 244/49 |

(Continued)

FOREIGN PATENT DOCUMENTS

| | | |
|---|---|---|
| EP | 0998225 B1 | 3/2000 |
| EP | 1375342 A1 | 1/2004 |

(Continued)

OTHER PUBLICATIONS

Canadian Office Action for related Canadian Application No. 2,824,108; Office Action dated Jun. 17, 2016.

(Continued)

*Primary Examiner* — Marc Burgess
(74) *Attorney, Agent, or Firm* — Miller, Matthias & Hull LLP

(57) ABSTRACT

A wing assembly comprises a raked wing tip having an outboard portion hinged to one of a main wing having at least one moveable control surface and an inboard raked wing tip portion. The outboard portion of the raked wing tip does not carry any moveable flight control surfaces.

20 Claims, 8 Drawing Sheets

(56) References Cited

U.S. PATENT DOCUMENTS

| | | | |
|---|---|---|---|
| 4,247,062 A * | 1/1981 | Brueckner | 244/91 |
| 4,824,053 A | 4/1989 | Sarh | |
| 5,072,894 A * | 12/1991 | Cichy | 244/91 |
| 5,310,138 A * | 5/1994 | Fitzgibbon | 244/49 |
| 5,381,986 A * | 1/1995 | Smith et al. | 244/49 |
| 5,558,299 A | 9/1996 | Veile | |
| 6,082,665 A * | 7/2000 | Spitzer | 244/2 |
| 6,089,502 A | 7/2000 | Herrick et al. | |
| 6,260,799 B1 * | 7/2001 | Russ | B64C 3/56 244/49 |
| 6,834,835 B1 | 12/2004 | Knowles et al. | |
| 7,275,722 B2 * | 10/2007 | Irving et al. | 244/201 |
| 7,744,038 B2 | 6/2010 | Sankrithi et al. | |
| 8,083,185 B2 * | 12/2011 | Konings | B64C 3/385 244/199.4 |
| 8,342,447 B2 | 1/2013 | Etling | |
| 8,777,153 B2 * | 7/2014 | Parker | B64C 3/56 244/49 |
| 8,894,018 B2 * | 11/2014 | Boer | B64C 23/072 244/199.4 |
| 9,908,612 B2 * | 3/2018 | Fox | B64C 3/56 |
| 2004/0000619 A1 | 1/2004 | Barriety | |
| 2009/0302159 A1 * | 12/2009 | Pajard | 244/124 |
| 2010/0084516 A1 | 4/2010 | Eberhardt | |
| 2011/0180657 A1 * | 7/2011 | Gionta et al. | 244/49 |

FOREIGN PATENT DOCUMENTS

| | | |
|---|---|---|
| EP | 1531126 A1 | 5/2005 |
| EP | 2650212 A1 | 10/2013 |
| GB | 481050 | 3/1938 |
| GB | 773739 A | 5/1957 |
| GB | 2454588 A | 5/2009 |
| WO | 2011051699 A2 | 5/2011 |
| WO | 20110561699 A2 | 5/2011 |
| WO | 2011070532 A1 | 6/2011 |

OTHER PUBLICATIONS

Search Report for related European Application No. 19175377.1; report dated Aug. 1, 2019.

* cited by examiner

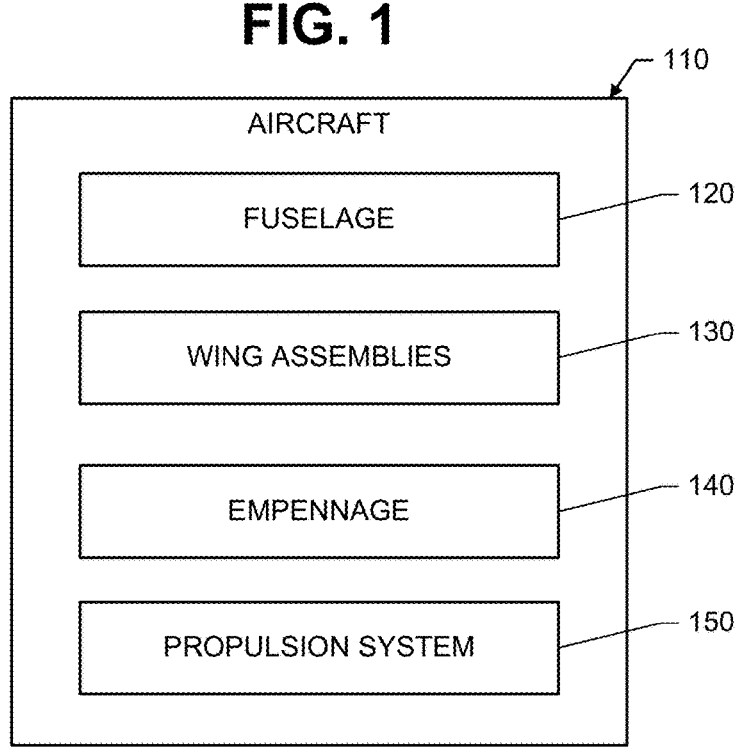
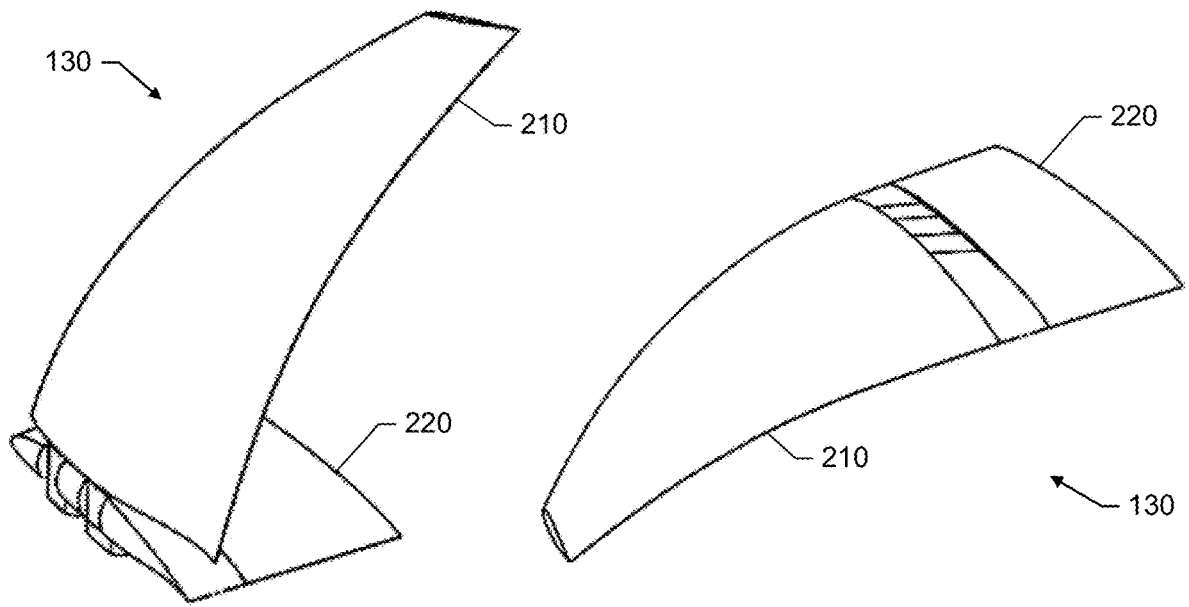

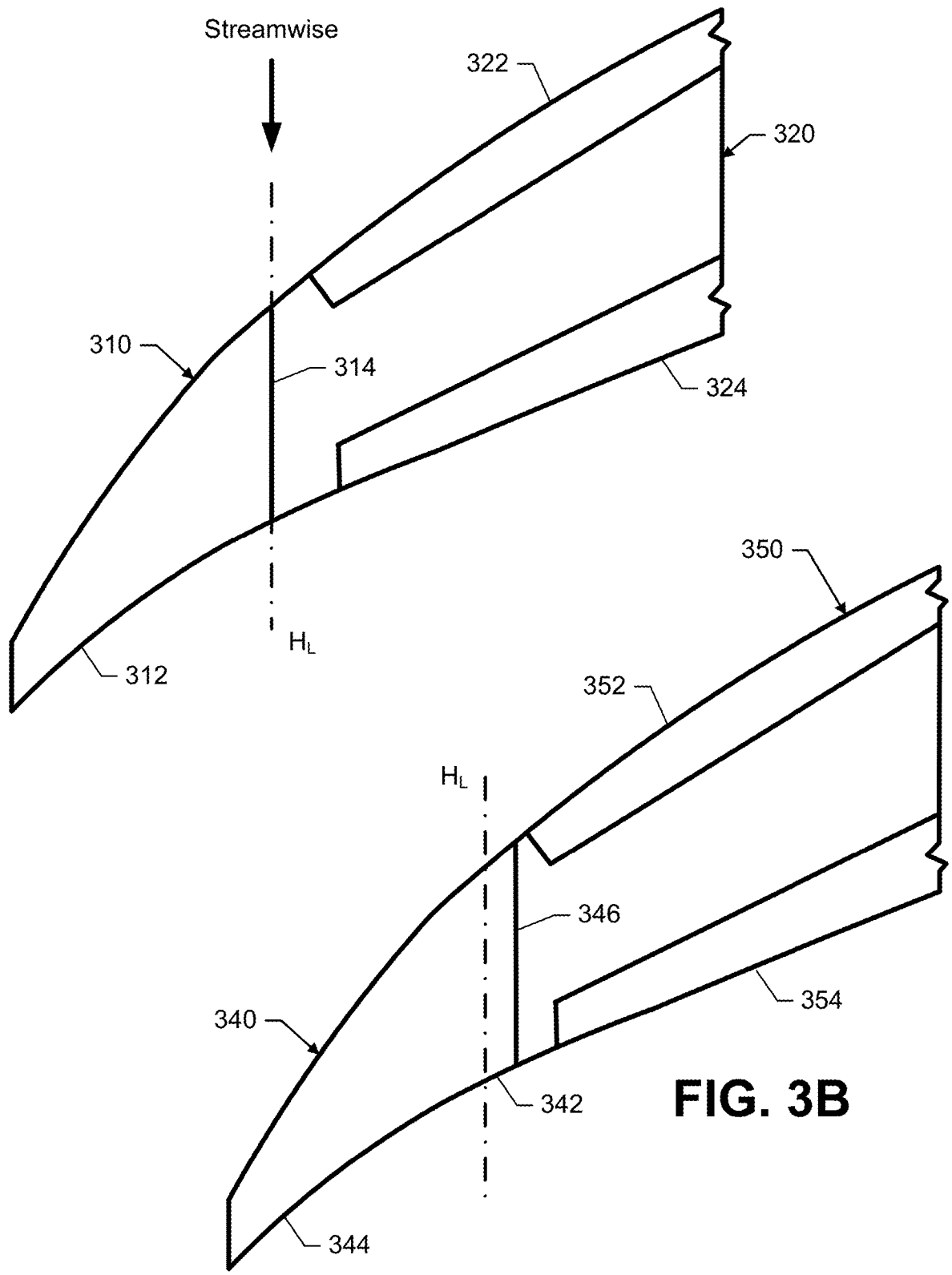

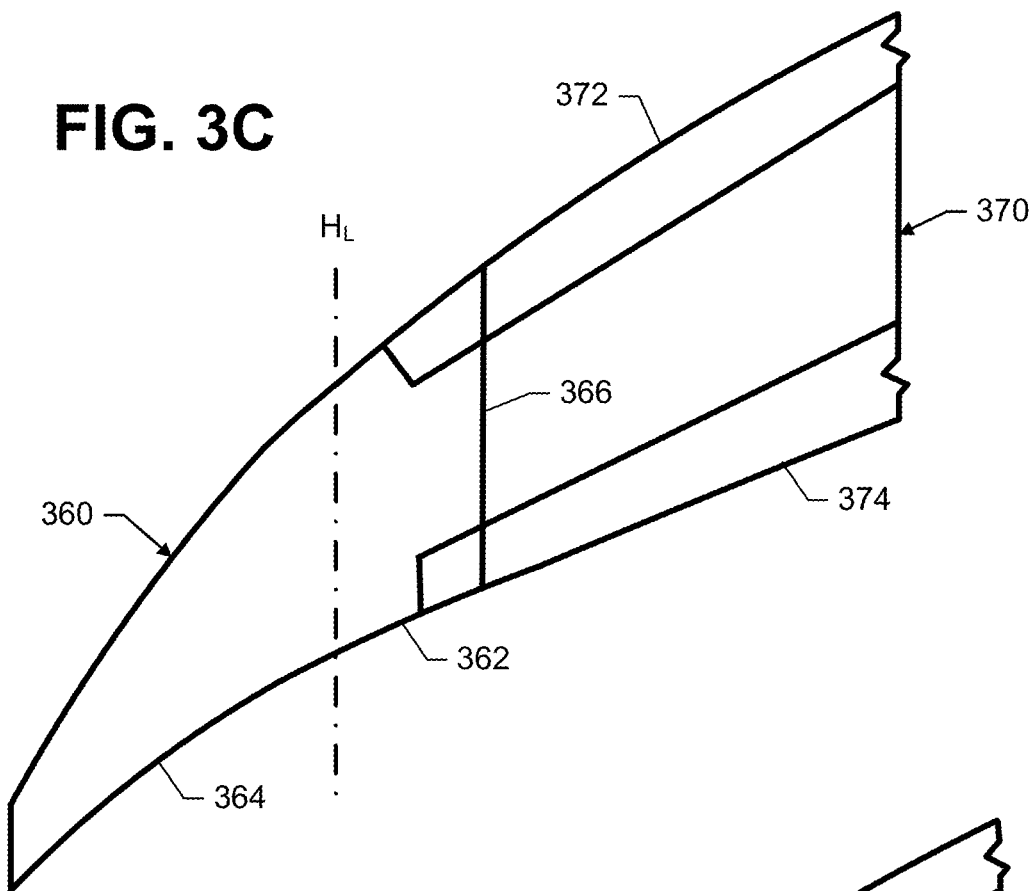
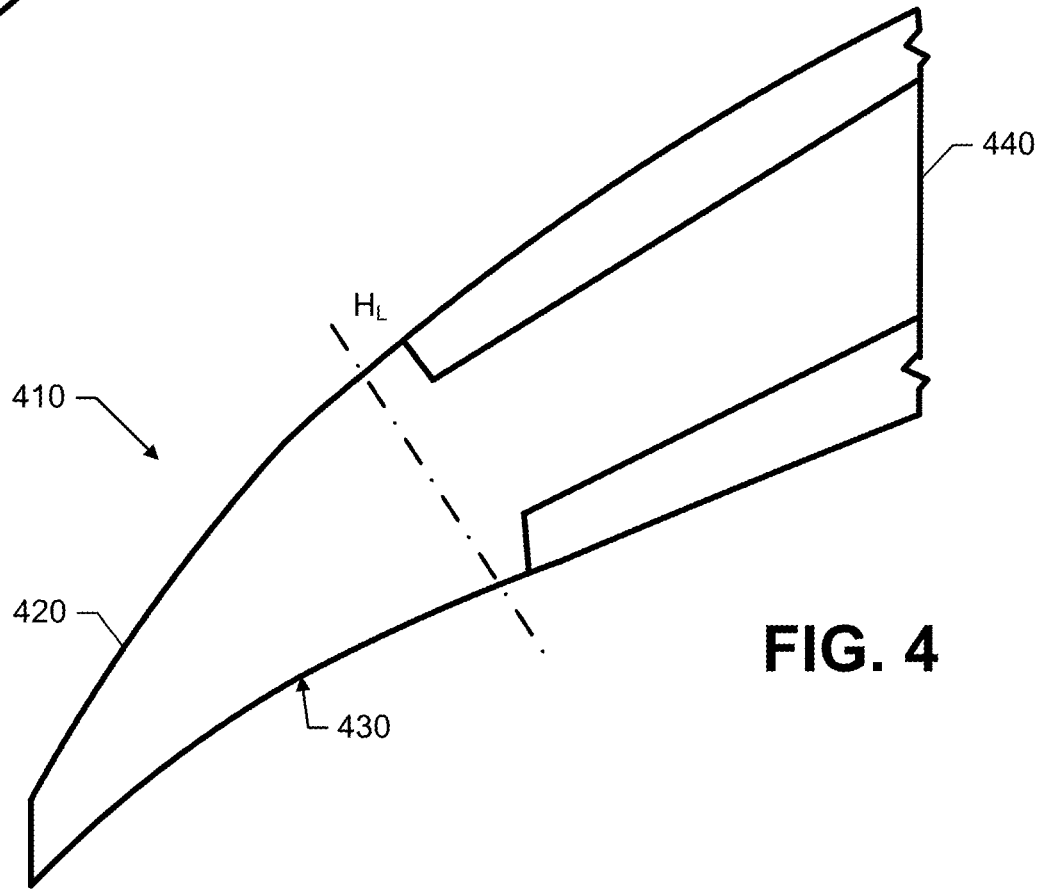

HINGED RAKED WING TIP

This is a continuation-in-part of copending U.S. Ser. No. 13/251,216 filed 1 Oct. 2011.

BACKGROUND

Long span wings are desirable for commercial aircraft as they are aerodynamically more efficient than shorter wings. The greater aerodynamic efficiency results in lower fuel consumption and, therefore, lowers operating costs.

However, existing airport designs place limits on aircraft wingspan. Airport designs are based on International Civil Aviation Organization (ICAO) Codes A through F, which establish dimensional limits on wingspan, landing gear width, length, etc. For instance, an ICAO Code E airport limits wingspan to less than 65 meters so the aircraft can fit within runways, taxiways, and gate areas.

A folding wing design may be used to reduce the span of these wings to fit within the limitations of an existing airport's infrastructure. Folding wings may be folded to fit within runways, taxiways, and gate areas, and they may be extended prior to takeoff to increase wingspan.

Folding wing designs are commonly used in naval aircraft. Folding wings enable naval aircraft to occupy less space in confined aircraft carrier hangars. Wing fold joints in naval aircraft use highly loaded hinges and locking pins acting over very small wing bending reaction moment arms. However, naval aircraft are much smaller than large commercial aircraft, and present folding wing designs for naval aircraft are optimized to different mission parameters than large commercial aircraft.

In commercial aircraft, a folding wing design may be scaled up. High reaction loads may be overcome by increasing the size of the hinges and locking pins. However, these size increases would increase aircraft weight, and increases in aircraft weight are undesirable because operating costs such as fuel costs are increased. Consequently, the increase in weight negates the advantages offered by the long span wings.

SUMMARY

According to an embodiment herein, a wing assembly comprises a raked wing tip having an outboard portion hinged to one of a main wing having at least one moveable control surface and an inboard raked wing tip portion. The outboard portion of the raked wing tip does not carry any moveable flight control surfaces.

According to another embodiment herein, an aircraft comprises first and second wing assemblies. Each wing assembly includes a wing having an inboard portion and a raked wing tip. The raked wing tip has an outboard portion hinged to the inboard portion. The outboard portion of the raked wing tip does not carry any moveable flight control surfaces.

According to another embodiment herein, an aircraft comprises a fuselage and wing assemblies attached to the fuselage. Each wing assembly includes an inboard section with moveable flight control surfaces, a raked wing tip hinged to the inboard section about a hinge line, and an actuator for moving the wing tip about the hinge line between a folded position and an extended position. The raked wing tip does not carry any moveable flight control surfaces.

According to another embodiment herein, a method of enhancing performance of an aircraft including wings with raked wing tips comprises folding outboard portions of the raked wing tips to comply with an airport code limiting wingspan length, and extending the outboard portions to increase wingspan for flight. The outboard portion does not have any moveable flight control surfaces.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of an aircraft.

FIGS. 2A and 2B are illustrations of a wing tip in a folded position and an extended position.

FIGS. 3A, 3B and 3C are illustration of a raked wing tip with a hinge line oriented in a streamwise direction.

FIG. 4 is an illustration of a raked wing tip with a hinge line oriented in a ribwise direction.

DETAILED DESCRIPTION

Figure 5:
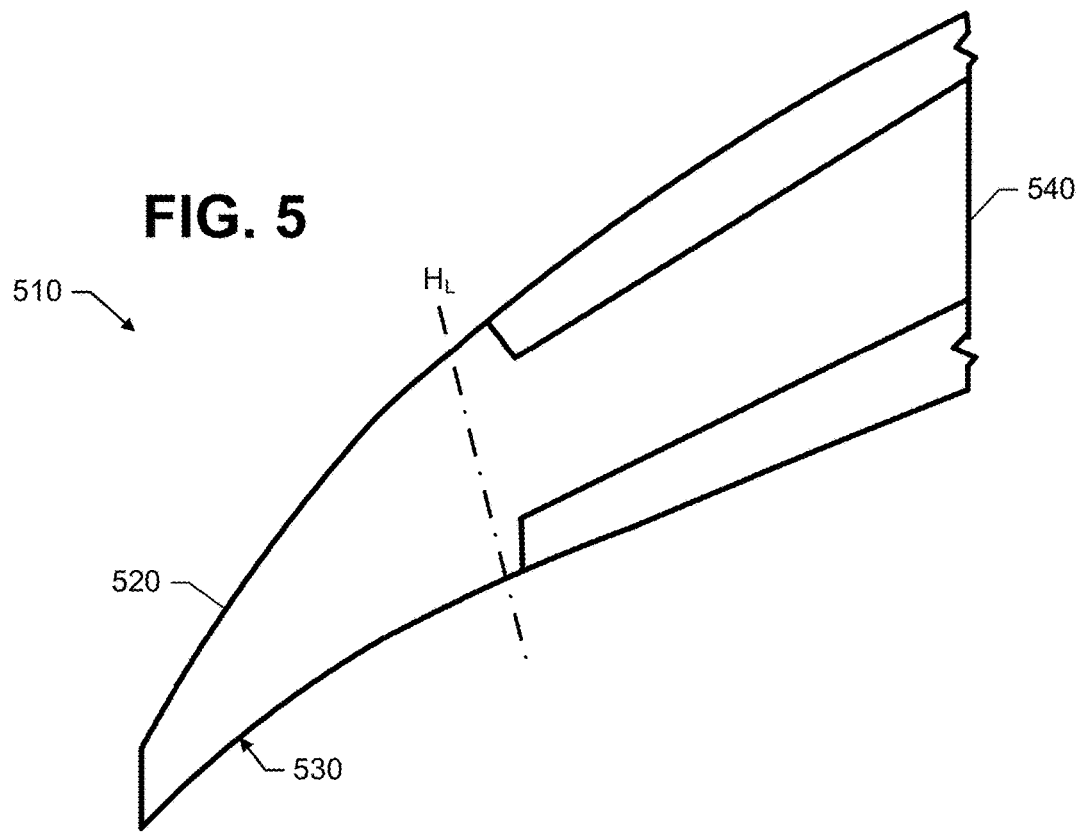
FIG. 5 is an illustration of a raked wing tip with a hinge line oriented in between streamwise and ribwise directions.

Reference is made to FIG. 1, which illustrates an aircraft 110 including a fuselage 120, wing assemblies 130 attached to the fuselage 120, and empennage 140 attached to the fuselage 120. One or more propulsion units 150 are coupled to the fuselage 120, wing assemblies 130 or other portions of the aircraft 110. Each wing assembly 130 includes a main wing and a wing tip that is hinged for movement between a folded position and an extended position. The main wings may be swept forward, have zero sweep, or be swept aft. The wing tips may be folded to fit the aircraft 110 within runways, taxiways, and gate areas. Folding the wing tips enables the aircraft to comply with airport codes, such as ICAO codes. The wing tips may be extended prior to takeoff to increase wingspan. The higher span enables higher aerodynamic efficiency.

FIGS. 2A and 2B are illustrations of a wing assembly 130 including raked wing tip 210 hinged to a main wing 220. FIG. 2A shows the wing tip 210 in a folded position, and FIG. 2B shows the wing tip 210 in an extended position, which results in the wing tip in approximately the same plane as the rest of the outboard portion of the main wing 220. In some embodiments, the wing tip 210 may be folded in a roughly vertical position to minimize ground area. In other embodiments, the wing tip 210 may be folded back onto the main wing 220.

FIGS. 3A to 9 illustrate main wings and raked wing tips. A main wing may include one or more wing boxes (each wing box including, for example, front and rear spars, ribs, stringers, and upper and lower skin panels), a leading edge, and a trailing edge. The leading edge has a leading edge sweep angle. The main wing further includes moveable flight control surfaces such as slats, flaps, ailerons and spoilers.

A raked wing tip may be generally characterized by (1) a leading edge sweep angle that is greater than the main wing leading edge sweep angle, and (2) chord length decreasing significantly in a spanwise direction. The leading edge sweep angle of the raked wing tip may increase singularly in some embodiments and progressively in other embodiments.

In all embodiments, the raked wing tip includes an outboard portion. The outboard portion does not carry any moveable flight control surfaces. In some embodiments, the raked wing tip may also include an inboard portion. The inboard portion of the raked wing tip may or may not carry moveable flight control surfaces.

Reference is now made to FIG. 3A, which illustrates a raked wing tip 310 whose outboard portion 312 is hinged to a main wing 320. The outboard portion 310 is hinged about a hinge line $H_L$, which is oriented in a streamwise (e.g. fore and aft) direction. The hinge line $H_L$ coincides with the root 314 of the wing tip 310.

In some embodiments, the outboard portion 312 may be folded about the hinge line $H_L$ between an extended position and an upward (e.g., vertical) folded position. In other embodiments, the outboard portion 312 may be folded about the hinge line $H_L$ between an extended position and a downward (e.g., vertical) folded position.

The outboard portion 312 of the raked wing tip 310 does not include any moveable flight control surfaces. The main wing 320 does include moveable flight control surfaces, including, but not limited to, a slat 322 and an aileron 324. The slat 322 may have a straight or curved leading edge (a curved leading edge is shown in FIG. 3A).

Reference is now made to FIG. 3B, which illustrates a raked wing tip 340 having an inboard portion 342 and an outboard portion 344 that is hinged to the inboard portion 342. The hinge line $H_L$ is oriented in a streamwise direction. The inboard portion is that portion between the hinge line $H_L$ and the root 346 of the wing tip 340. The root 346 of the wing top 340 is fixed to a main wing 350. The inboard portion 342 of FIG. 3B does not carry any moveable surfaces, whereas the main wing 350 does carry moveable flight control surfaces 352 and 354.

Reference is now made to FIG. 3C, which also illustrates a raked wing tip 360 having an inboard portion 362 and an outboard portion 364 that is hinged to the inboard portion 362. A root 366 of the wing tip 360 is fixed to a main wing 370. In the embodiment of FIG. 3C, however, the inboard portion 362 includes a flight control surface (a slat 372 and aileron 374).

FIGS. 4 to 8 illustrate different (non-streamwise) orientations of the hinge line. In each of these FIGS. 4-8, the root of the wing tip is hinged to the main wing (that is, the outboard portion hinged to the main wing). It is understood, however, that each of these different hinge line orientations may be applied to wings in which the outboard portions of the wing tips are hinged to inboard portions of the wing tips.

Reference is now made to FIG. 4, which illustrates a wing assembly 410 including the outboard portion 420 of the raked wing tip 430 hinged to the main wing 440 about a hinge line $H_L$ that is oriented in a ribwise direction. The ribwise direction is parallel to the closeout rib (not shown) of the main wing 440. An advantage of the ribwise orientation is easer integration of systems and structure.

Reference is now made to FIG. 5, which illustrates a wing assembly 510 including the outboard portion 520 of the raked wing tip 530 hinged to the main wing 540 about a hinge line $H_L$ that is oriented between the streamwise and ribwise directions. An advantage of this hinge line orientation is a balance between favorable integration and torsional stiffness.

Figure 6:
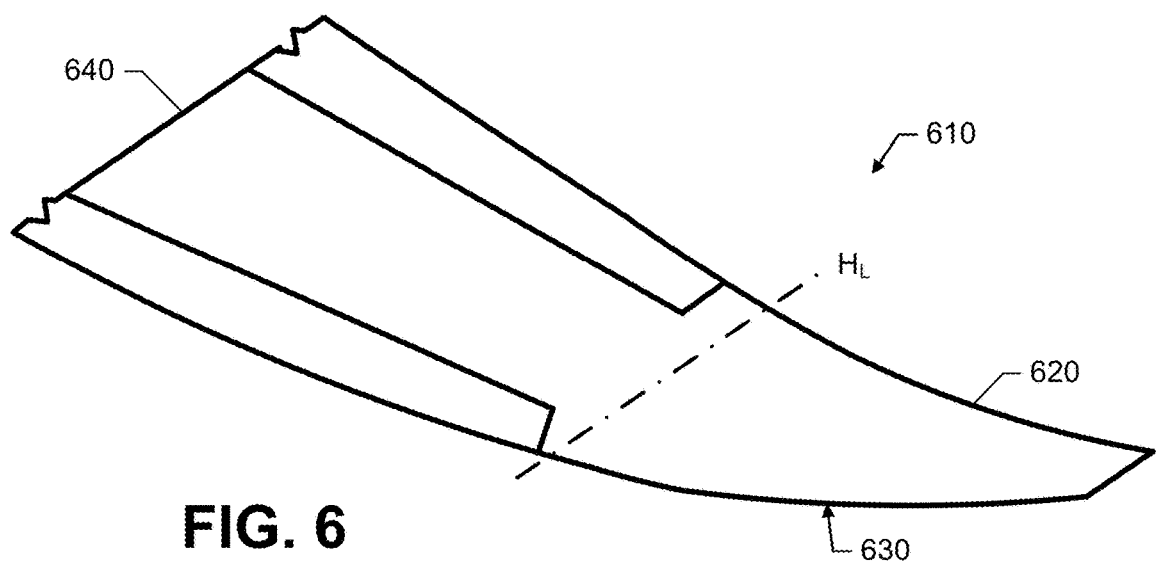
FIG. 6 is an illustration of a raked wing tip with a hinge line that is coincident with a skin panel.

Reference is now made to FIG. 6, which illustrates a wing assembly 610 including the outboard portion 620 of the raked wing tip 630 hinged to the main wing 640 about a hinge line $H_L$ that is coincident with a skin panel. The skin panel may be an upper panel or a lower panel. An advantage of this hinge line orientation is easier integration of fold actuators.

Figure 7:
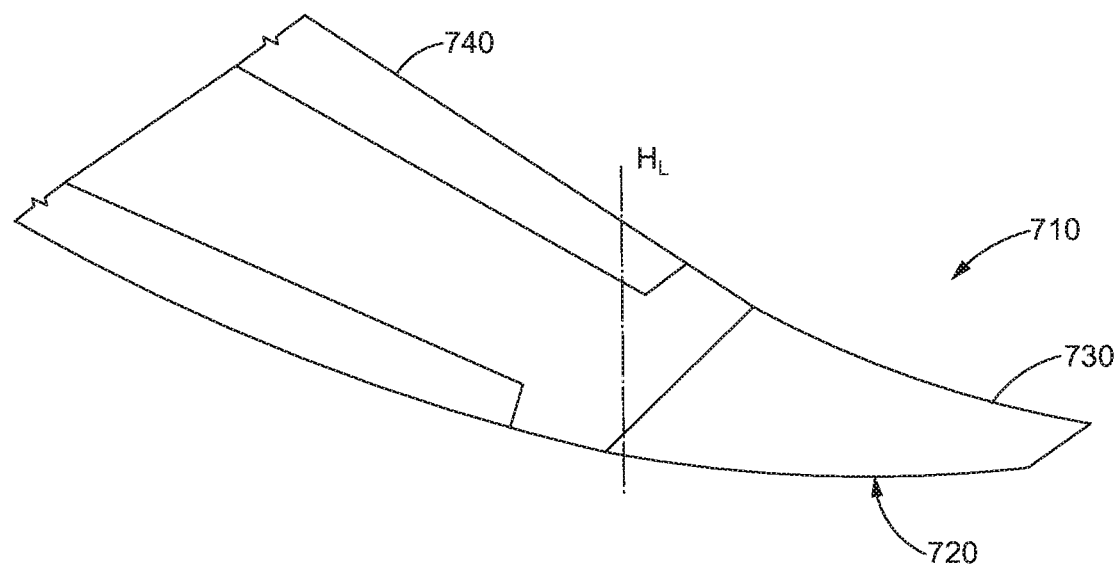
FIG. 7 is an illustration of a raked wing tip with a vertical hinge line.

Reference is now made to FIG. 7, which illustrates a wing assembly 710 including the outboard portion 730 of the raked wing tip 720 hinged to the main wing 740 about a substantially vertical hinge line $H_L$ within the wing assembly 710. The wing tip 720 is moved to an extended position to maximize wingspan, and the wing tip 720 is moved to a folded position to increase sweep. An advantage of this vertical orientation is lower loads in cross winds.

Figure 8A:
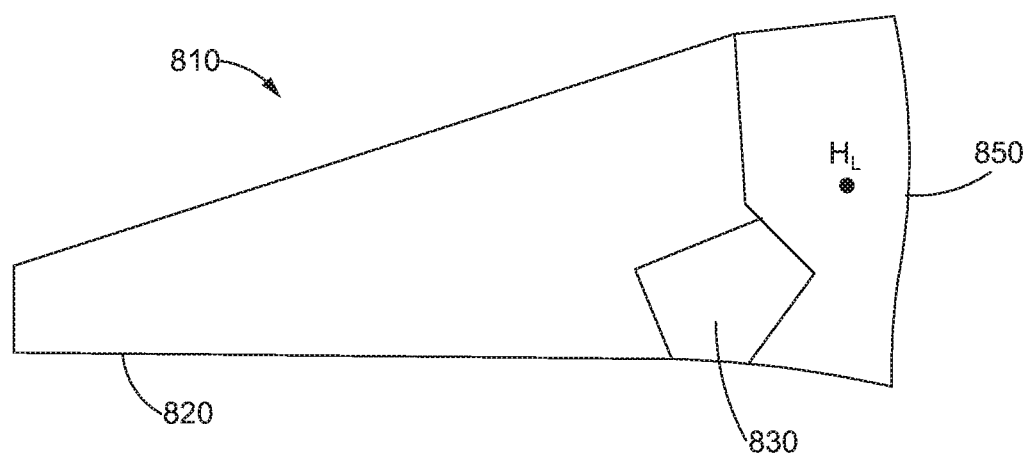
FIGS. 8A and 8B are illustrations of a raked wing tip with a vertical hinge line and a movable panel for enabling interference-free movement between folded and extended positions.
Figure 8B:
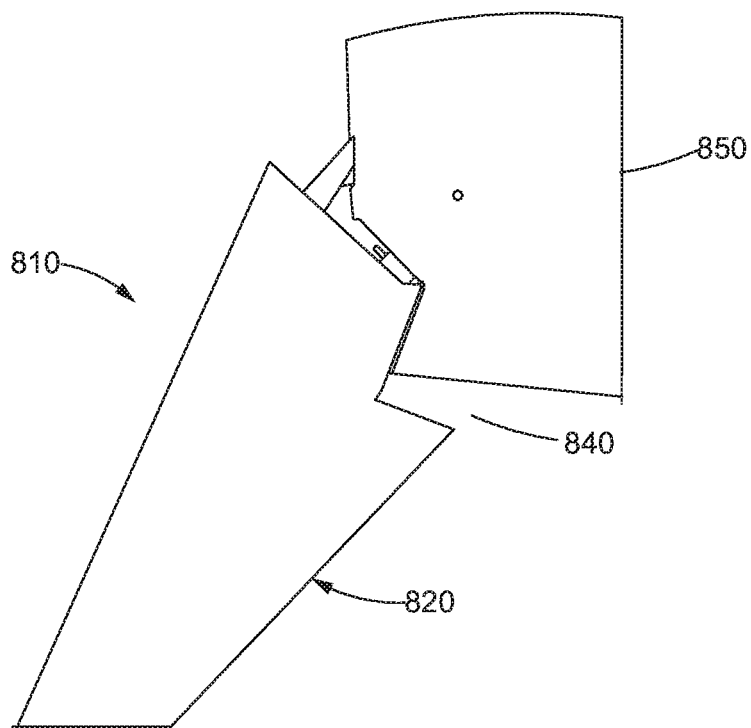

Reference is now made to FIGS. 8A and 8B, which illustrate a wing assembly 810 including a raked wing tip 820 with a movable panel 830 for enabling interference-free movement between folded and extended positions. As shown in FIG. 8B, the wing tip 820 includes an opening 840 at its root. The opening 840 enables the wing tip 820 to avoid inboard interference with the main wing 850 when the wing tip 820 is folded.

As shown in FIG. 8A, the moveable panel 830 covers the opening 840 when the wing tip 820 is extended. The moveable panel 830 may be opened and closed by a slaved mechanical linkage or an actuator.

The outboard portion is hinged to either the inboard portion or the main wing by a hinge assembly. The hinge assembly is not limited to any particular type. In some embodiments, the hinge assembly may include conventional hinges and locking pins. The outboard portion may be hinged to an upper skin panel for upward folding, or to a lower skin panel for downward folding. The locking pins lock the outboard portion in either the folded position or the extended position.

Figure 9:
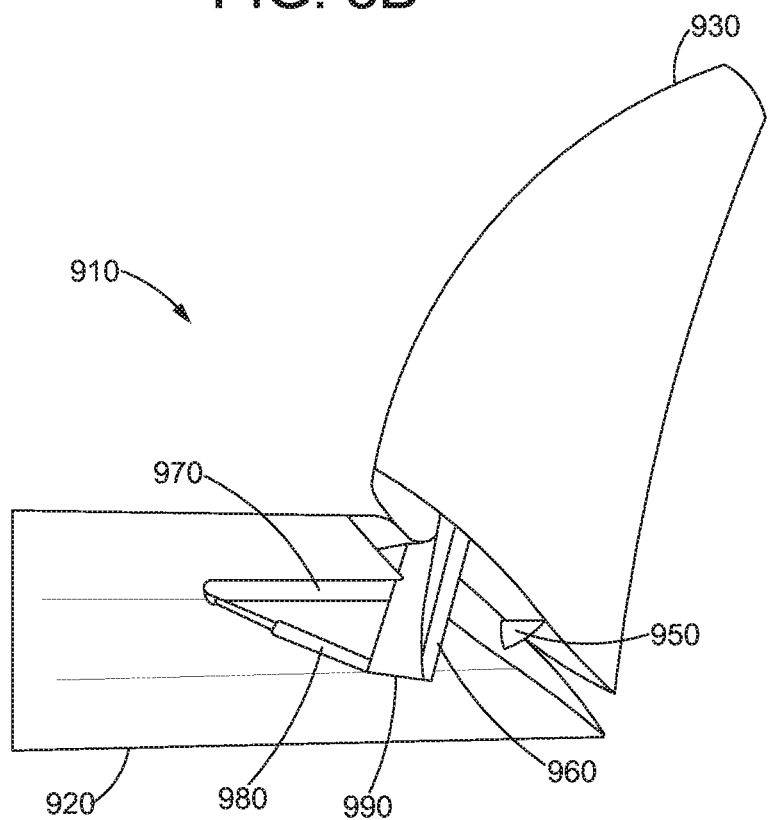
FIG. 9 is an illustration of a raked wing tip and hinge assembly including a stub spar.

In other embodiments, the hinge assembly may include a stub spar as described in U.S. Ser. No. 13/251,216, which is incorporated herein by reference. As shown in FIG. 9, a wing 910 includes hinges 950 for allowing the wing tip 930 to fold about the upper surface of the main wing section 920. Thus, the hinge line is coincident with the upper skin panel. The wing tip 930 further includes at least one stub spar 960. Each stub spar 960 extends from an end of the wing tip 930. Each stub spar 960 is part of the wing tip 930 and rotates with the wing tip 930.

A single stub spar 960 is shown in FIG. 9. When the wing tip 930 is folded to the folded position, that stub spar 960 is roughly vertical (as shown in FIG. 9). As the wing tip 930 is being folded towards the extended position, that stub spar 960 enters into the main wing section 920 via a stub spar door 970. When the wing tip 930 reaches the extended position, that stub spar 960 is aligned with at least one of the spars in the main wing section 920.

The wing tip 930 may be folded by applying force to a free end of the stub spar 960. The force may be generated by an actuator (not shown) and transmitted to the stub spar 960 via a rod 980. A locking pin receptacle 990 is located at a free end of the stub spar 960. The receptacle 990 receives a locking pin when the wing tip is in the extended position The locking pin locks the stub spar 960 to an aligned spar in the main wing section 920.

The stub spar 960 redirects the moment arm (along the main wing section 920) and provides a longer moment arm than a conventional design. In a conventional design, the moment arm is taken across the distance between wing surfaces (that is, the short height of the wing thickness). The longer moment arm reduces reacting forces on a locking pin and hinges 150. This enables smaller, lighter hinges and locking pins to be used. It also enables the hinges 150 to be mounted between skin panels. Because the hinges 150 are not external, either drag is reduced or a fairing is not needed to reduce drag.

Figure 10:
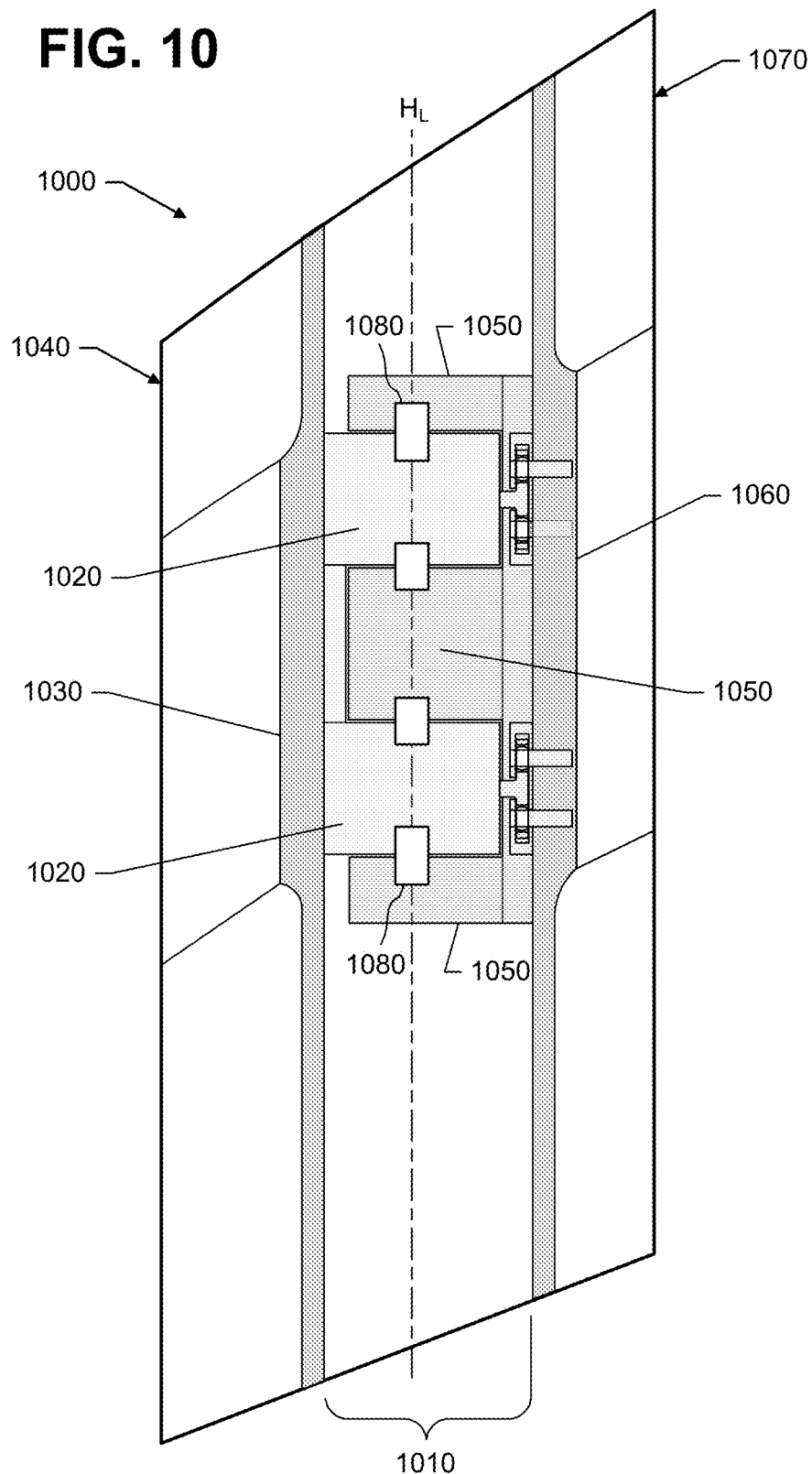
FIG. 10 is an illustration of a wing assembly including a hinge assembly with hinged torque boxes.

In still other embodiments, the hinge assembly may include hinged torque boxes as described in U.S. Ser. No. 13/664,371 filed 30 Oct. 2012, which is also incorporated herein by reference. As illustrated in FIG. 10, the hinge assembly 1010 includes at least one torque box 1020 extending from a closeout rib 1030 of an outboard portion 1040, and at least one torque box 1050 extending from a closeout rib 1060 of an inboard portion 1070 of a wing assembly 1000. The torque boxes 1020 and 1050 are hinged together via hinge lines 1080 so the outboard portion 1040 can be folded about a hinge line $H_L$.

A wing assembly herein may have a long wingspan, yet still be used in existing airports. The longer wingspan enables higher aerodynamic efficiency.

A wing assembly herein may have a long span, yet still be used in existing airports. The higher span enables higher aerodynamic efficiency.

Figure 11:
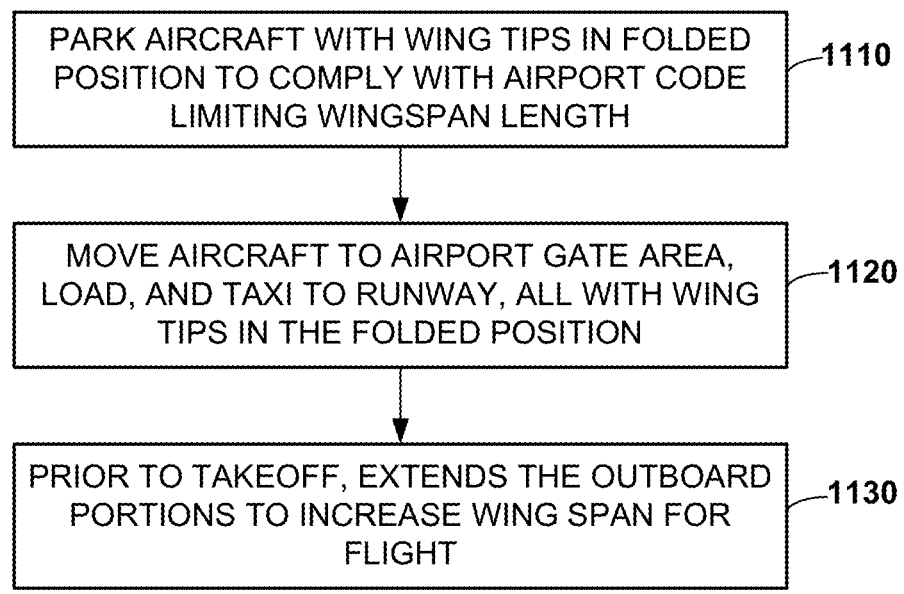
FIG. 11 is an illustration of a method of enhancing performance of a commercial aircraft including wings with raked wing tips.

Reference is now made to FIG. 11, which illustrates a method of enhancing performance of a commercial aircraft including wing assemblies with raked wing tips. The aircraft is located at an airport that place limits on aircraft's wingspan. For instance, the airport is an ICAO Code E airport, which limits wingspan to less than sixty five meters.

At block 1110, the aircraft is parked with outboard portions of its wing tips in a folded position. At block 1120, the aircraft is moved to a gate area, loaded, and taxied to a runway. The wing tips remain in the folded position so the aircraft can fit within taxiways en route to the runway.

At block 1130, prior to takeoff, the outboard portions of the wing tips are extended for flight. By extending the outboard portions, wingspan is increased and, as a result, aerodynamic efficiency is increased. The greater aerodynamic efficiency results in lower fuel consumption and, therefore, lower operating costs.

The invention claimed is:

1. A wing assembly comprising:
one of a main wing having at least one moveable control surface and an inboard raked wing tip portion, wherein the main wing or the inboard raked wing tip portion includes an upper skin panel and a lower skin panel, and a stub spar door is formed in one of the upper skin panel and the lower skin panel;
an outboard raked wing tip portion rotatably coupled to the main wing or the inboard raked wing tip portion by a hinge defining a hinge line about which the outboard raked wing tip portion rotates relative to the main wing or the inboard raked wing tip portion, the outboard raked wing tip portion being rotatable about the hinge line between a folded position and an extended position, in which the outboard raked wing tip portion is approximately co-planar with the main wing or the inboard raked wing tip portion;
a stub spar coupled to the outboard raked wing tip portion, the stub spar extending from an end of the outboard raked wing tip portion and positioned to pass through the stub spar door as the outboard raked wing tip portion rotates about the hinge line between the folded position and the extended position, the stub spar being configured for insertion into the main wing or the inboard raked wing tip portion when the outboard raked wing tip portion is in the extended position, wherein a free end of the stub spar defines a locking location for coupling to the main wing;
the main wing or the inboard raked wing tip portion including a main wing spar;
a locking device for locking the free end of the stub spar to the spar of the main wing or the inboard raked wing tip portion, thereby to secure the outboard raked wing tip portion in the extended position; and
an actuator coupled to the free end of the stub spar and configured to rotate the outboard raked wing tip portion about the hinge line between the folded position and the extended position.

2. The wing assembly of claim 1, wherein the outboard raked wing tip portion is hinged to the main wing.

3. The wing assembly of claim 1, wherein the outboard raked wing tip portion is hinged to the inboard raked wing tip portion, the inboard raked wing tip portion having at least one moveable flight control surface.

4. The wing assembly of claim 1, wherein the wing assembly is swept.

5. The wing assembly of claim 4, wherein the outboard raked wing tip portion forms a leading edge sweep angle that is greater than the leading edge sweep angle of the main wing, and chord length that decreases significantly in a spanwise direction.

6. The wing assembly of claim 1, wherein the hinge line is oriented in a streamwise direction.

7. The wing assembly of claim 1, wherein the hinge line is parallel to a ribwise direction.

8. The wing assembly of claim 1, wherein the hinge line is oriented at an angle between streamwise and ribwise directions.

9. The wing assembly of claim 1, wherein the hinge line is coincident with one of the upper skin panel and lower skin panel.

10. The wing assembly of claim 1, wherein the wing assembly has a wingspan greater than 65 meters when the outboard raked wing tip portion is in the extended position, and wherein the wing assembly has a wingspan less than 65 meters when the outboard raked wing tip portion is in the folded position.

11. The wing assembly of claim 1, wherein the outboard raked wing tip portion, and the one of the inboard raked wing tip portion and the main wing are configured for a commercial aircraft.

12. An aircraft comprising:
a fuselage;
wing assemblies attached to the fuselage, each wing assembly including:
an inboard section with moveable flight control surfaces, the inboard section including a main wing spar, an upper skin panel and a lower skin panel, and a stub spar door is formed in one of the upper skin panel and the lower skin panel;
a raked wing tip rotatably coupled to the inboard section by a hinge defining a hinge line about which the raked wing tip rotates relative to the inboard section, the raked wing tip having no moveable flight control surfaces and being rotatable about the hinge line between a folded position and an extended position, in which the raked wing tip is approximately co-planar with the inboard section;

a stub spar coupled to the raked wing tip, the stub spar extending from an end of the raked wing tip and positioned to pass through the stub spar door as the wing tip rotates about the hinge line between the folded position and the extended position, the stub spar being configured for insertion into the inboard section and alignment with the main wing spar when the raked wing tip is in the extended position, wherein a free end of the stub spar defines a locking location for coupling to the main wing;

a locking assembly for locking the free end of the stub spar to the main wing spar, thereby to secure the wing tip in the extended position; and an actuator coupled to the free end of the stub spar and configured to rotate the outboard raked wing tip portion about the hinge line between the folded position and the extended position.

13. The method of claim 12, wherein the aircraft has a wingspan greater than 65 meters when the raked wing tips are in the extended position, and wherein the wing assembly has a wingspan less than 65 meters when the raked wing tips are in the folded position.

14. The aircraft of claim 12, wherein the hinge line of each wing assembly is coincident with one of the upper skin panel and lower skin panel.

15. The aircraft of claim 12, wherein the hinge line of each wing assembly is oriented in a streamwise direction.

16. A method of enhancing performance of an aircraft including wings with raked wing tips, the method comprising folding outboard portions of the raked wing tips in a folded position for taxiing, extending the outboard portions in an extended position, in which the raked wing tips are approximately co-planar with associated main wings, to increase wingspan for flight; wherein each of the outboard portions is rotatably coupled to the associated main wing by a hinge defining a hinge line about which the outboard raked wing tip portion rotates relative to the associated main wing; wherein each of the outboard portions further includes a stub spar extending from an end of the outboard portion and positioned to pass through a stub spar door formed in one of an upper skin panel and a lower skin panel provided on an associated main wing as the outboard portion rotates about the hinge line between the folded position and the extended position, wherein each stub spar is configured for insertion into the main wing when the outboard portion is in the extended position; wherein a free end of each stub spar defines a locking location for coupling to a main wing spar of the main wing; wherein a locking assembly locks the free end of the stub spar to the main wing spar to secure each wing tip in the extended position; and wherein an actuator is coupled to the free end of each stub spar and configured to rotate the associated outboard portion about the hinge line between the folded position and the extended position.

17. The aircraft of claim 16, wherein the hinge line is oriented in a streamwise direction.

18. The aircraft of claim 16, wherein the hinge line is parallel to a ribwise direction.

19. The aircraft of claim 16, wherein the hinge line is oriented at an angle between streamwise and ribwise directions.

20. The aircraft of claim 16, wherein the aircraft has a wingspan greater than 65 meters when the raked wing tips are in the extended position, and wherein the aircraft has a wingspan less than 65 meters when the raked wing tips are in the folded position.

* * * * *